United States Patent [19]
Lewis

[11] Patent Number: 5,593,624
[45] Date of Patent: Jan. 14, 1997

[54] METHOD FOR MAKING CELLULAR PACKAGING BOARD WITH INHIBITOR

[76] Inventor: Eugene R. Lewis, 25 Chatfield Rd., Prospect, Conn. 06712

[21] Appl. No.: 449,832

[22] Filed: May 24, 1995

[51] Int. Cl.⁶ .................................................. B29C 44/02
[52] U.S. Cl. .............................. 264/48; 264/53; 264/157; 521/57
[58] Field of Search ..................................... 264/51, 53, 55, 264/DIG. 9, 48, 157; 521/57

[56] References Cited

U.S. PATENT DOCUMENTS

| | | |
|---|---|---|
| 2,914,377 | 11/1959 | Bull . |
| 3,428,720 | 2/1969 | Denslow ........................... 264/DIG. 9 |
| 3,767,785 | 11/1973 | Bordenca . |
| 4,290,912 | 9/1981 | Boerwinkle et al. . |
| 4,524,154 | 6/1985 | Maeda et al. ............................ 264/53 |
| 4,525,485 | 6/1985 | Maeda et al. ............................ 264/53 |
| 4,579,701 | 4/1986 | Park et al. ................................ 264/53 |
| 4,584,175 | 4/1986 | Martenson . |
| 4,656,205 | 4/1987 | Walker et al. ........................... 523/201 |
| 4,676,939 | 6/1987 | Kuwabara .................................. 264/50 |
| 4,968,723 | 11/1990 | Senda et al. ............................... 521/60 |
| 4,973,448 | 11/1990 | Carlson et al. . |
| 5,128,073 | 7/1992 | Allen et al. ............................... 264/53 |
| 5,139,700 | 8/1992 | Miksic et al. . |
| 5,154,886 | 10/1992 | Franey et al. . |
| 5,160,025 | 11/1992 | Greenawald . |
| 5,209,869 | 5/1993 | Miksic et al. . |
| 5,320,778 | 6/1994 | Miksic et al. . |

Primary Examiner—Allan R. Kuhns
Attorney, Agent, or Firm—Pepe & Hazard

[57] ABSTRACT

A method of making beaded foam molded products with corrosion inhibitor incorporated therein includes the steps of expanding a foamable synthetic resin into puffed beads, spraying onto the puffed beads a liquid containing a vapor phase corrosion inhibitor to provide a coating thereon, and molding the coated puffed beads into a beaded foam molded product with the corrosion inhibitor dispersed throughout the thickness thereof and migratable to the surface thereof.

12 Claims, 4 Drawing Sheets

METHOD FOR MAKING CELLULAR PACKAGING BOARD WITH INHIBITOR

BACKGROUND OF THE INVENTION

The present invention relates to the manufacture of beaded foam molded products and, more particularly, to an improvement in beaded foam molded board and the like which includes a vapor phase corrosion inhibitor useful in packaging and other applications.

Beaded foam molded products, as used herein, includes board, blocks and forms which are produced by molding expanded beads or prepuffs of polystyrene and its interpolymers and its alloys such as polystyrene/polyethylene, polypropylene and its interpolymers, and such other resins as may be developed for use in making such board, blocks and forms.

Vapor phase corrosion inhibitor agents presently can be found in stock packaging materials in several forms such as, for example, in polyethylene bags, extruded plastic sheeting or film, paperboard and paper wrapping. Alternatively, such agents can be provided in small canisters and other devices containing the inhibitor and permitting its vapors to emanate therefrom into the package enclosure in which placed. These devices are called emitters in that they emit the vapors of the corrosion inhibitor over time. In a like manner, such agents may be supplied within paper or fabric packets which are placed in the packages. Such packets usually take the form of an air permeable envelope in which is provided a corrosion inhibitor. An example of such a typical packet is disclosed in U.S. Pat. No. 4,973,448 issued to Carlson, et al. on Nov. 27, 1990. Here it is disclosed to fabricate the packets or envelopes using fabric material comprised preferably of an synthetic resin polymer material, such as polyethylene, and a powdered volatile corrosion inhibitor, such as an organic amine acid salt.

In lieu of such packets and or emitters, solid corrosion inhibitors, e.g. pills or tablets, may simply be placed into the packaging with the shipped item. In some instances, the product being placed in the container may be sprayed or otherwise coated with the corrosion inhibitor. For any of these items to work, the person responsible for packaging must remember to place the inhibitor into the container or on the product before shipping. In any event, these approaches involve added steps and costs and may not be effective for providing protection for extended period of time.

Hence, another approach to providing corrosion inhibiting material in packaging is disclosed in U.S. Pat. No. 5,320,778. In this patent, it is disclosed to incorporate the corrosion inhibitor in a foam material during the extruding process. The corrosion inhibitor used however is a vapor phase inhibitor-desiccant composite in which a granular cylocogell is used as the substrate onto which the vapor phase corrosion inhibiting component is deposited and this composite material is incorporated in the extrusion process.

Beaded foam plank, custom shapes or board and blocks are extensively used to provide support for and protect articles being shipped. Frequently, such blocks are configured to provide recesses which seat the articles, or the beads may be molded into custom shapes. Bags containing the corrosion inhibitor are included in packages utilizing such beaded foam board to cushion the contents.

In addition, there has been recognized a need to provide inert materials which would provide corrosion protection for metal structural elements in various structures and prior to use in construction.

Accordingly, it is an object of the present invention to provide a novel method for making a beaded foam molded product having a vapor phase corrosion inhibitor incorporated therein and which may be readily used for packaging a product which is susceptible to corrosion.

It is also an object of the invention to provide such a method wherein the corrosion inhibiting material is applied to the puffed foam beads in the course of the conventional process of manufacture.

Another object of the invention is to provide a novel beaded foam molded product containing a vapor phase corrosion inhibitor throughout.

SUMMARY OF THE INVENTION

It has now been found that the foregoing and related objects may be readily attained in a method for making beaded foam molded product with a vapor phase corrosion inhibitor incorporated therein which includes expanding a foamable synthetic resin with a blowing agent into puffed beads and coating the puffed beads with a liquid containing a vapor phase corrosion inhibitor, The coated beads are transported into a block, custom mold or plank forming mold, and heat and pressure are applied to the coated beads in the mold to fuse the beads and form a beaded foam block, custom molded form or plank with the corrosion inhibitor incorporated therethroughout, the inhibitor being able to migrate to the surface of the molded product and emanate therefrom.

Desirably, the coating step is effected by spraying the liquid onto the puffed beads as they are being transported from the expanding step to the mold, preferably as they are passing through a spray chamber. This spraying is best effected while the beads are moving upwardly through the chamber and the liquid is sprayed upwardly to travel therewith.

Desirably, the liquid is applied in an amount of 4–40 ounces per 100 cubic feet of the puffed beads. Preferably, the liquid includes mineral oil or other substance to etch the surface of the beads liquid etches the surface of the puffed beads.

Steam is introduced into the mold to fuse the beads into the desired product, and blocks and planks which may be cut into boards of lesser thickness.

The resulting product is a beaded foam molded product board comprising fused puffed beads coated with a vapor phase corrosion inhibitor which is dispersed throughout the board and is migratable to the surface of the board to emanate therefrom.

DETAILED DESCRIPTION OF THE PREFERRED EMBODIMENT

Figure 1:
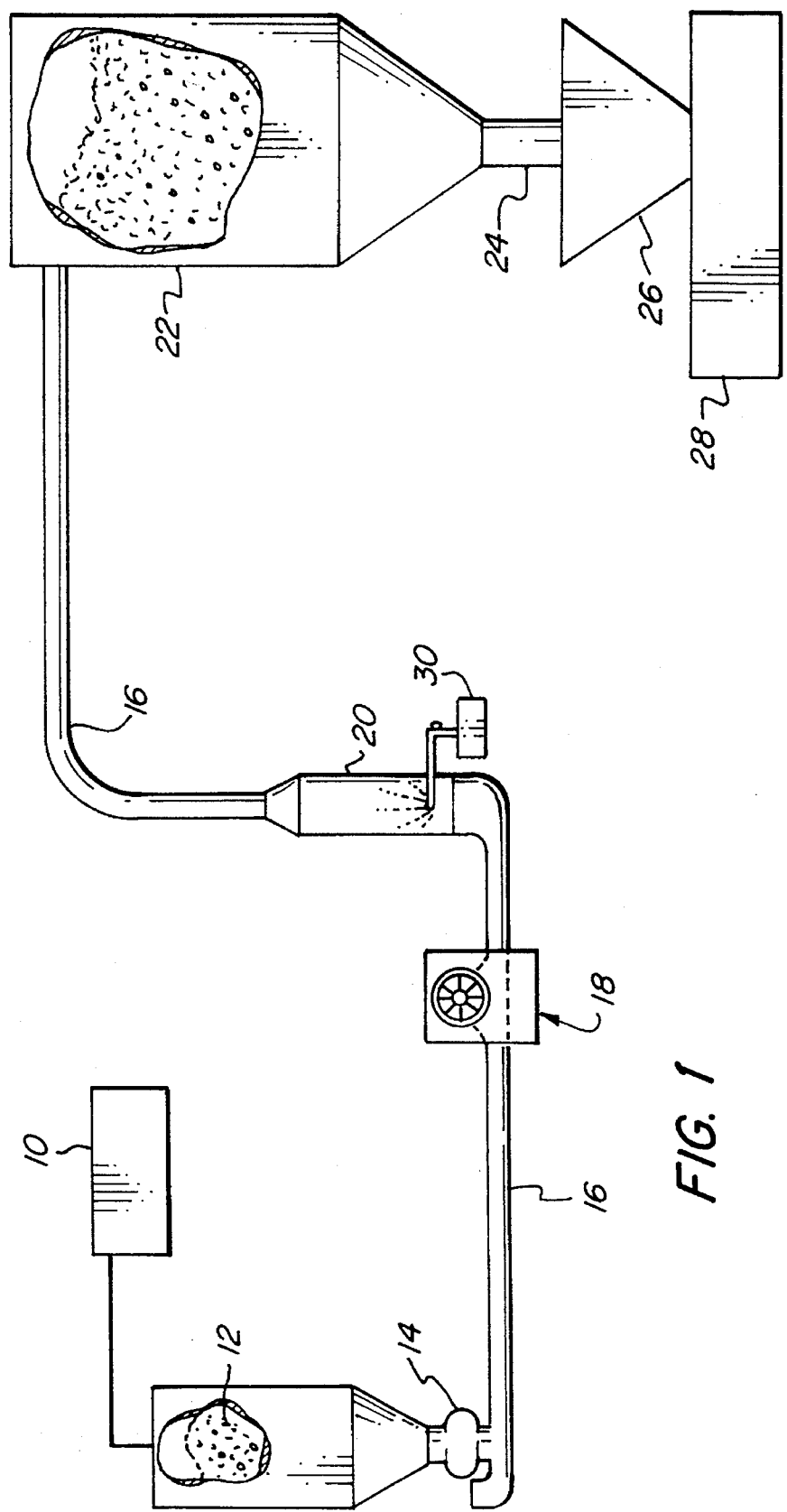
FIG. 1 is a diagrammatic illustration of a manufacturing installation utilizing a process embodying the method of the present invention.
Figure 3A:
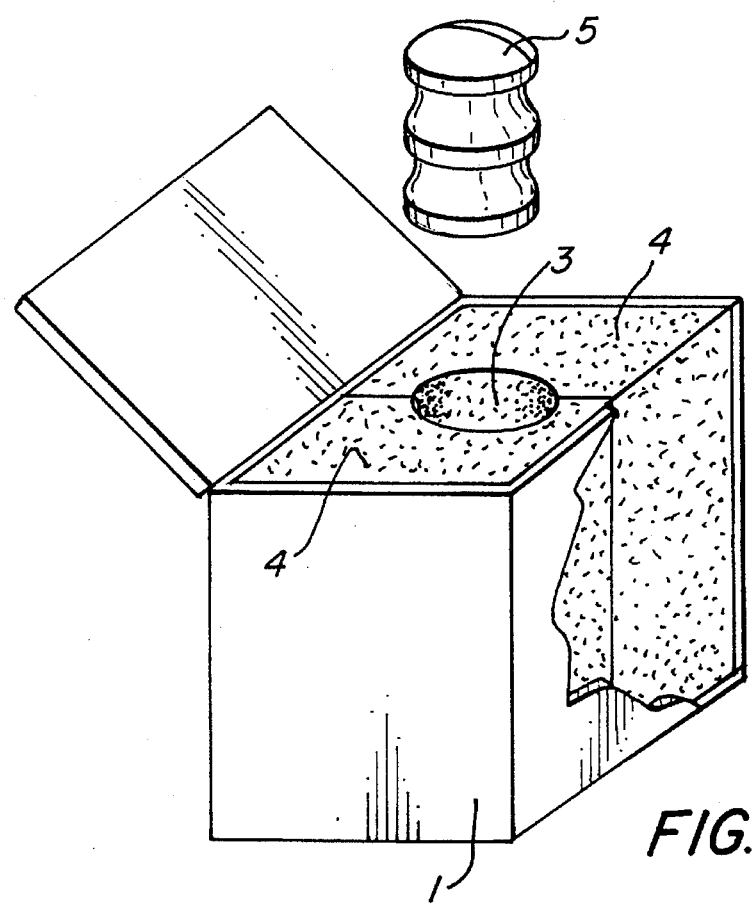
FIG. 3a is a partially fragmentary perspective view illustrating a package utilizing a beaded foam packaging insert fabricated in accordance with the method of the invention.
Figure 3B:
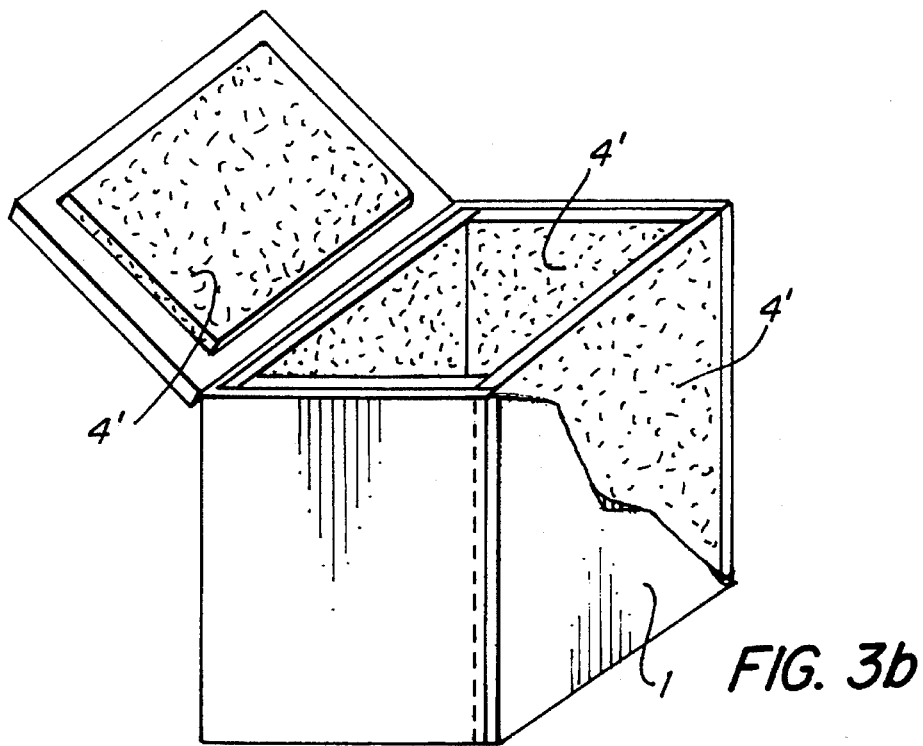
FIG. 3b is a partially fragmentary perspective view illustrating a beaded foam board fabricated in accordance with the method of the invention.

Turning first to FIG. 1, therein schematically illustrated is the apparatus employed in the present invention to create beaded foam block which is then used in packaging or construction applications such as those illustrated in FIGS. 3a–3c. As illustrated in FIG. 3a, the beaded foam material of the present invention may be molded or cut to provide a recess 3 in which an article 5 can be securely seated. As illustrated in FIG. 3b, short lengths of board 4' may be cut to provide a liner for the container 1. As will be readily appreciated, the block may be cut into small pieces which are used as a filler around articles in a container. Numerous other techniques for the use of beaded foam board are well known.

Turning in detail to FIG. 1, foamable synthetic resin and a blowing agent such as pentane are first expanded into cellular beads or puffs in conventional apparatus indicated by the numeral 10. The puffed beads are then transported into a storage container or hopper 12 wherein they may be stored for a period of time to allow residual blowing agent to escape. The beds will generally have a diameter of $1/32–1/2$ inch depending upon the resin.

In the next step of the process, the puffed beads are metered out of the storage hopper 12 by a metering device 14 into a conduit 16 through which they are transported in an air stream effected by the blower 18. In the conduit 16 is an enlarged drum or spray chamber 20 in which they are sprayed with a liquid composition containing the corrosion inhibitor as they pass therethrough.

The coated beads then continue in the conduit 16 to a storage hopper 22 in which they are stored prior to molding into the desired foam. As required, the coated beads are discharged through the conduit 24 into a device 26 for loading the molds 28 in which they will be fused into block, plank or custom shapes in accordance with conventional practice wherein steam introduced into the mold causes them to fuse into the form defined by the mold. However, other molding processes may also be used including just heat and pressure to fuse the beads.

The resultant molded form has the corrosion inhibitor dispersed throughout so that it is not only at the surface as formed but can migrate to the surface from within the thickness of the material.

The puffed beads which are contained in the storage hopper 12 are generally kept there for a period of about 12 hours following expansion. Alternatively, the storing of the puffed beads following the expansion step may be done off-site, with the beads being subsequently loaded into the hopper 12 when needed just prior to the spraying process. The flow of the beads discharged from the supply means 12 and transported through the system is regulated by the metering means 14 is conveniently regulated between a minimum flow rate of about 30 cubic feet per second and a maximum flow rate of about 100 cubic feet per second.

Figure 2:
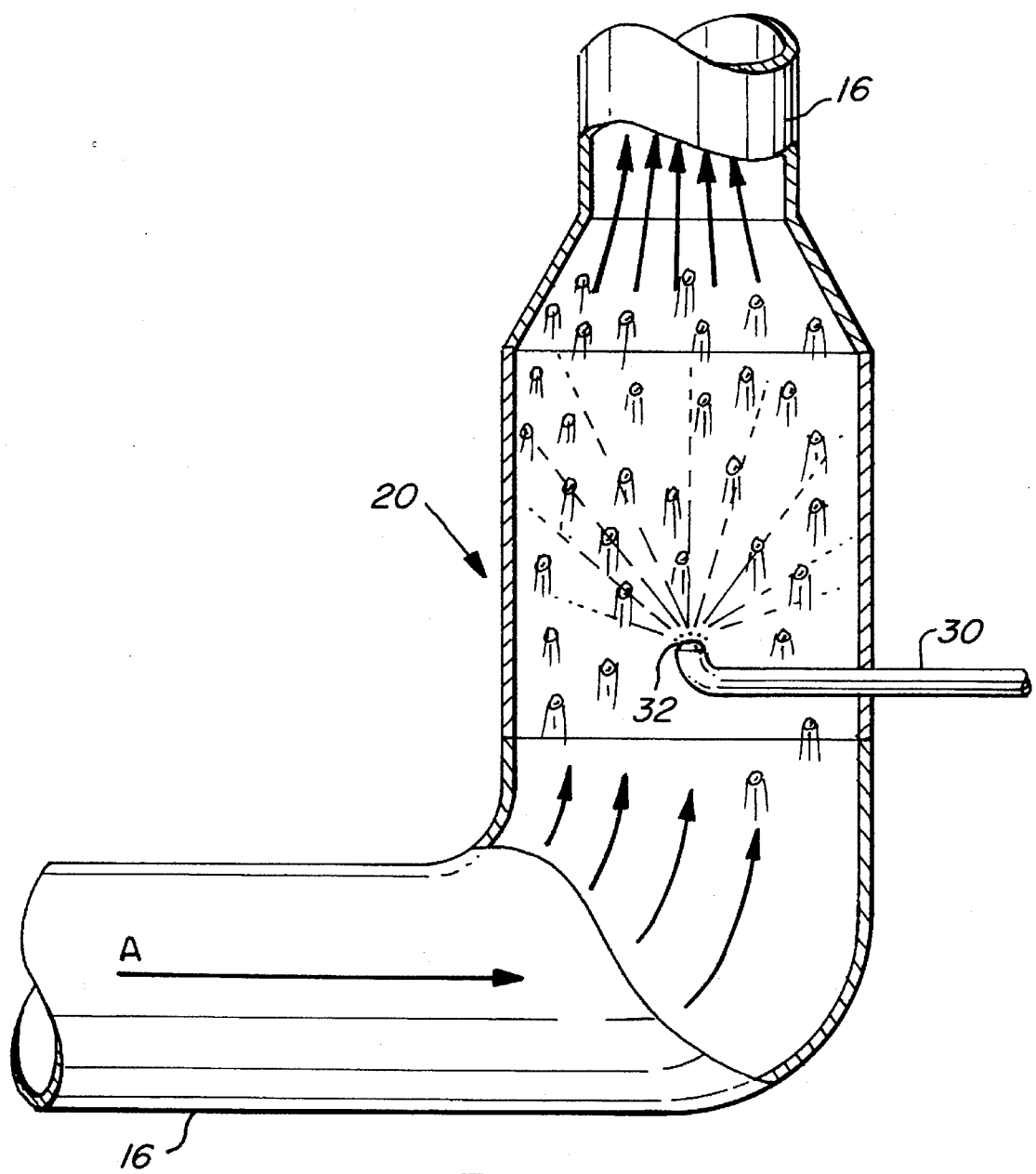
FIG. 2 is a fragmentary vertical section through the spraying chamber of the installation of FIG. 1 showing in detail the process of spraying the puffed beads.

Referring now to FIG. 2, therein illustrated in greater detail is the spray chamber 20 which is essentially a diametrically expanded length of the conduit means 16 through which the expanded beads or prepuffs are moved and simultaneously sprayed with the liquid corrosion inhibitor. As the beads move from the first section of the conduit means 16 into the chamber 20, the density of the beads greatly decreases due to the change in area of the passage. This is important in accomplishing proper coating of the beads as they move through the chamber 20 because it enable the spray of liquid to pass about and between the otherwise closely packed beads. By way of example, in the preferred embodiment the chamber 20 has a length of approximately 4 feet and a diameter ranging between 12–14 inches, with the inner diameters of the first and second sections of the conduit 16 each being about equal to 8 inches, hence constituting a diameter increase of at about 50 percent.

Disposed within the chamber 20 is a spray head 30 providing a nozzle 32 at the center of the chamber 20 and it is upwardly directed in the direction of the flow of the beads therethrough. The liquid flow to the nozzle 32 is controlled to provide the desired volume for the rate of flow of the beads and it will be appreciated that the liquid spray will move with the beads as they pass therethrough and into the conduit 16. For most applications, the rate of flow of the liquid is 4 to 30 ounces of the liquid containing the corrosion inhibitor to 30 to 100 cubic feet of the moving beads.

Once in the storage hopper 22 (which can be replaced by storage bags for temporary storage), the coated beads may be stored if so desired. Generally the coated beads may be transported to the mold after exiting the conduit 16; however, storage may increase the etching and penetration of the beads by the corrosion inhibitor.

Figure 4A:
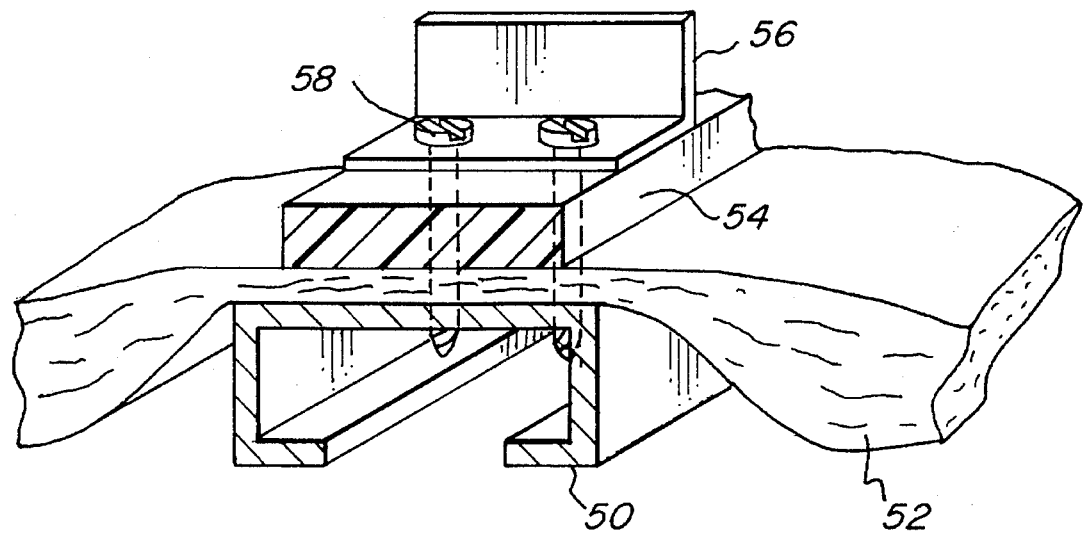
FIGS. 4a and 4b are illustrations of a roofing section beaded foam board to provide corrosion protection for the metallic fasteners.
Figure 4B:
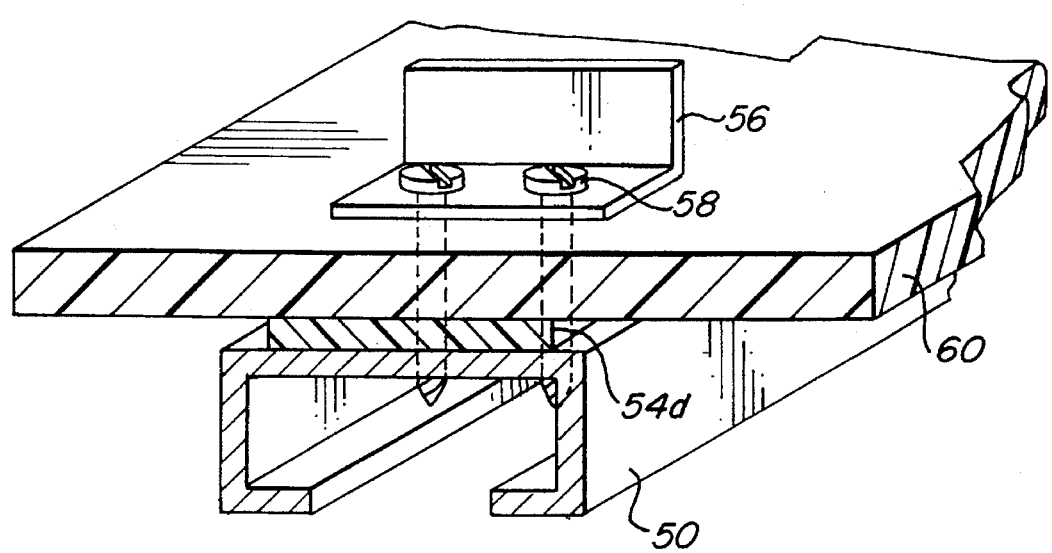

FIGS. 4a and 4b illustrate usage of the beaded foam product of the present invention in construction application to reduce corrosion of the metallic fasteners. In roofing and other application, moisture tends to produce corrosion of fasteners or about fasteners, often because of deficiencies in the metals which are in contact. These figures illustrate two roofing applications in which the beam 50 supports metal purlins (not shown) which provide the basic structure of the roof decking.

In FIG. 4a, to provide a thermal barrier, fiberglass insulation 52 is provided over the beams 50 and a thermal block 54 of insulating material is placed thereon. The clips 56 which secure the purlins to the beam 50 are fastened to the beam by the fasteners 58. Use of the beaded foam material of the present invention for the thermal block 54 provides a desirable degree of corrosion protection for the fasteners 58.

In FIG. 4b, the beaded foam material of the present invention is used to provide the thermal block 54d on top of the beam 50 and expanded polystyrene board 60 is placed thereon.

Various corrosion inhibiting compositions are known for use in combination with organic materials. Generally, such compositions contain triazoles, inorganic and organic nitrites, nitrates, phosphates and carbonates, and aliphatic and aromatic amines or their salts which are believed to migrate to the surface in the presence of water vapor and which provide the desired protection although the mechanism is not fully understood. These compositions may also include desiccants and are preferably water-based compositions which generally include a carrier such as mineral oil.

Such compositions are described in the literature including Carlson et al U.S. Pat. No. 4,973,448; Miksic et al U.S. Pat. No. 5,139,700; Miksic U.S. Pat. No. 5,209,869; and Miksic et al U.S. Pat. No. 5,320,778. Suitable compositions are readily available from Cortec Corporation of St. Paul Minn. and illustrative materials which have been satisfactorily employed are those sold by Cortec under the designations VCI-337 and VCI-337F and MASTERBATCH 126.

Generally, the amount of inhibitor required to provide the protective properties is 0.75–2.5 percent by weight of the beaded foam product, and preferably 1.5–2.0 percent.

Illustrative of the present invention is the following specific example.

In a conventional step, polystyrene and a pentane blowing agent are heated to create expanded puffed beads each having an average diameter on the order of about 0.0625 inch (between 0.6 to 1.2 mm). A volume of 50 cubic feet of puffed beads per minute passing through a 14 inches diameter spray chamber was sprayed with a liquid corrosion inhibitor at the rate of 12 ounces per minute. The corrosion inhibitor was that sold by Cortec Corporation of St. Paul, Minn. under the designation VCI-337F.

The coated beads were transported to a hopper from which they were dispensed into a block mold having a width of 50 inches, a depth of 26 inches and a length of 18 feet. Following closure of the mold, steam was introduced thereinto to effect fusion of the beads into a beaded foam block.

After removal from the mold, various packaging sections were formed therefrom and placed in packages with various corrodible articles. After storage for several weeks in a moisture containing atmosphere, the containers were opened and the articles stored therein were found to be free from evidence of corrosion.

Thus, it can be seen from the foregoing detailed specification that the method of the present invention provides a beaded foam material with a corrosion inhibitor incorporated therein which is formed by a highly efficient process. This beaded foam material can be utilized conveniently in packaging of various articles to provide both insulation from impact and corrosion inhibition, and in building construction to protect fasteners and other metallic elements from corrosion.

Having thus described the invention, what is claimed is:

1. A method for making beaded foam molded products with a vapor phase corrosion inhibitor incorporated therein comprising:
    (a) expanding a foamable synthetic resin with a blowing agent into puffed beads;
    (b) transporting said beads through a conduit in suspension in air;
    (c) coating said puffed beads with a liquid containing a vapor phase corrosion inhibitor as they are being transported in suspension in said conduit;
    (d) depositing said coated beads into a metallic mold;
    (e) applying heat and pressure to said coated beads in said mold to fuse said beads and form a beaded foam molded product with said corrosion inhibitor incorporated therethroughout, said inhibitor being able to migrate to the surface of said product and emanate therefrom;
    (f) forming said molded product into packaging inserts; and
    (g) placing said inserts in an enclosure to provide a vapor phase inhibitor within said enclosure.

2. The method of making beaded foam molded product in accordance with claim 1 wherein said coating step is effected by spraying the liquid onto the puffed beads as they are being transported from the expanding step to the mold.

3. The method of making beaded foam molded product in accordance with claim 2 wherein said spraying step is conducted by spraying said liquid onto the beads as they are passing through a spray chamber.

4. The method of making cellular packaging polystyrene board in accordance with claim 3 wherein said beads are moving upwardly through said chamber and said liquid is sprayed upwardly to travel therewith.

5. The method of making beaded foam molded product in accordance with claim 1 wherein said liquid is applied in an amount of 4–40 ounces per 100 cubic feet of said puffed beads.

6. The method of making beaded foam molded product in accordance with claim 1 wherein said liquid etches the surface of said puffed beads.

7. The method of making beaded foam molded product in accordance with claim 1 wherein steam is introduced into said mold to fuse said beads into said molded product.

8. The method of making beaded foam molded product in accordance with claim 1 including the step of cutting said product into smaller sections.

9. A method for making beaded form molded products with a vapor phase corrosion inhibitor incorporated therein comprising:
    (a) expanding a foamable synthetic resin with a blowing agent into puffed beads;
    (b) coating said puffed beads with a liquid containing a vapor phase corrosion inhibitor by spraying said liquid into said puffed beads in a spray chamber as they are being transported from the expanding step to the mold, said beads moving upwardly through said chamber and said liquid being sprayed upwardly to travel therewith;
    (c) depositing said coated beads into a mold; and
    (d) applying heat and pressure to said coated beads in said mold to fuse said beads and form a beaded foam molded product with said corrosion inhibitor incorporated therethroughout, said inhibitor being able to migrate to the surface of said product and emanate therefrom.

10. The method of making beaded foam molded product in accordance with claim 9 wherein said liquid is applied in an amount of 4–40 ounces per 100 cubic feet of said puffed beads.

11. The method of making beaded foam molded product in accordance with claim 9 wherein said liquid etches the surface of said puffed beads.

12. The method of making beaded foam molded product in accordance with claim 9 including the step of cutting said product into smaller sections.

* * * * *